United States Patent
Thakkar

(10) Patent No.: US 11,989,596 B2
(45) Date of Patent: May 21, 2024

(54) CARBON FOOTPRINT CLIMATE IMPACT SCORES FOR DATACENTER WORKLOADS

(71) Applicant: Dell Products L.P., Round Rock, TX (US)

(72) Inventor: Bina Thakkar, Cary, NC (US)

(73) Assignee: DELL PRODUCTS L.P., Round Rock, TX (US)

(*) Notice: Subject to any disclaimer, the term of this patent is extended or adjusted under 35 U.S.C. 154(b) by 96 days.

(21) Appl. No.: 17/585,521

(22) Filed: Jan. 26, 2022

(65) Prior Publication Data
US 2023/0236904 A1   Jul. 27, 2023

(51) Int. Cl.
G06F 9/50 (2006.01)
G06F 11/30 (2006.01)
G06F 11/34 (2006.01)

(52) U.S. Cl.
CPC ........ G06F 9/5094 (2013.01); G06F 11/3006 (2013.01); G06F 11/3495 (2013.01)

(58) Field of Classification Search
CPC . G06F 9/5094; G06F 11/3006; G06F 11/3495
See application file for complete search history.

(56) References Cited

U.S. PATENT DOCUMENTS

| | | | |
|---|---|---|---|
| 2010/0191998 A1* | 7/2010 | Moore | G06Q 10/06 713/340 |
| 2010/0235654 A1 | 9/2010 | Malik et al. | |
| 2011/0161968 A1* | 6/2011 | Bash | G06F 9/5094 718/102 |
| 2015/0241947 A1 | 8/2015 | Allen-Ware et al. | |
| 2018/0268981 A1 | 9/2018 | Chen et al. | |
| 2021/0342185 A1* | 11/2021 | Naidu | G06F 1/3206 |
| 2023/0017632 A1* | 1/2023 | Herb | G06F 11/3058 |

FOREIGN PATENT DOCUMENTS

CN   111126707 A   5/2020

OTHER PUBLICATIONS

Genetic Algorithms, https://www.geeksforgeeks.org/genetic-algorithms/, 2022, 15 pgs.
Office Action for U.S. Appl. No. 17/585,524 dated Mar. 6, 2023.
Final Office Action received for U.S. Appl. No. 17/585,524, dated Jul. 10, 2023, 18 pages.

(Continued)

*Primary Examiner* — Zahid Choudhury
(74) *Attorney, Agent, or Firm* — Amin, Turocy & Watson, LLP

(57) ABSTRACT

The technology described herein is directed towards determining a datacenter's power consumption of its devices at the workload level, from which an objective carbon footprint impact score can be determined. Devices can include servers, network devices such as switches, and storage devices. For a group of workloads at a location, workload power consumption values can be determined based on collected power-related workload metrics data. The power consumption values are used in determining per-workload carbon footprint values for the workloads based on the location. One or more actions can be taken to modify the respective carbon footprint values, e.g., moving a workload to a different location, changing device hardware, and so on.

20 Claims, 10 Drawing Sheets

(56) References Cited

OTHER PUBLICATIONS

Non-Final Office Action received for U.S. Appl. No. 17/585,524, dated Aug. 31, 2023, 11 pages.
Notice of Allowance received for U.S. Appl. No. 17/585,524, dated Dec. 28, 2023, 15 pages.
Notice of Allowance received for U.S. Appl. No. 17/585,524, dated Mar. 22, 2024, 6 pages.

* cited by examiner

CARBON FOOTPRINT CLIMATE IMPACT SCORES FOR DATACENTER WORKLOADS

BACKGROUND

At present, datacenters use on the order of one to two percent of the world's electricity, and contribute to approximately two percent of the world's carbon dioxide emissions. These percentages continue to increase over time. For some systems, over eighty-five percent of those systems' carbon footprints are due to power consumed during product utilization.

A growing number of customers have to report their carbon footprint impacts. In general, all customers want to reduce their datacenters' carbon footprints across servers, network devices (Ethernet switches, routers, Fiber Channel switches) and storage systems. Typically carbon footprint impact data is based on the total energy (kilowatt hours of electricity) used by the data center.

BRIEF DESCRIPTION OF THE DRAWINGS

The technology described herein is illustrated by way of example and not limited in the accompanying figures in which like reference numerals indicate similar elements and in which.

DETAILED DESCRIPTION

Various aspects of the technology described herein are generally directed towards a more consistent and accurate way to calculate a datacenter's power consumption of its devices at the workload level, from which an objective carbon footprint impact score can be determined. To this end, a carbon footprint impact score is calculated for individual workloads across servers, switches, routers and storage systems.

The score can be normalized across multiple datacenters, including on premise datacenters and cloud (including centralized and edge) datacenters. For example, in one implementation, a value ranging from zero to one-hundred can be used to indicate a carbon footprint climate impact score for a datacenter; a zero score would mean there is no climate impact/there is a green solution, while a nonzero score indicates some carbon impact to the climate, with the higher the score the higher the climate impact of a datacenter.

It should be understood that any of the examples herein are non-limiting. Thus, any of the embodiments, aspects, concepts, structures, functionalities or examples described herein are non-limiting, and the technology may be used in various ways that provide benefits and advantages in communications and computing in general. It also should be noted that terms used herein, such as "optimize" or "optimal" and the like (e.g., "maximize," "minimize" and so on) only represent objectives to move towards a more optimal state, rather than necessarily obtaining ideal results.

Reference throughout this specification to "one embodiment," "an embodiment," "one implementation," "an implementation," etc. means that a particular feature, structure, or characteristic described in connection with the embodiment/implementation is included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

Aspects of the subject disclosure will now be described more fully hereinafter with reference to the accompanying drawings in which example components, graphs and/or operations are shown. In the following description, for purposes of explanation, numerous specific details are set forth in order to provide a thorough understanding of the various embodiments. However, the subject disclosure may be embodied in many different forms and should not be construed as limited to the examples set forth herein.

Figure 1:
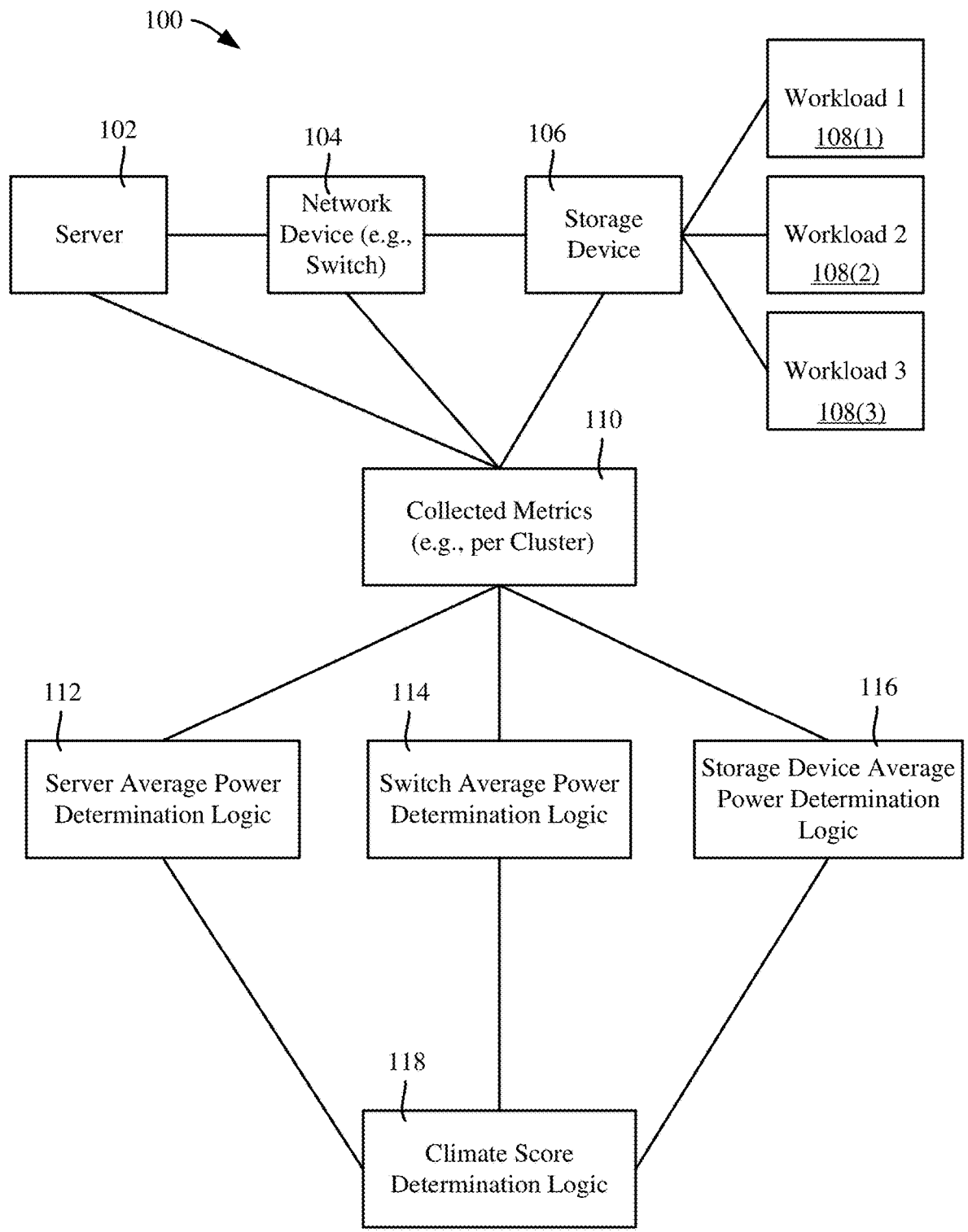
FIG. 1 is a block diagram representation of example components from which a climate score can be determined on a per workload basis, in accordance with various aspects and implementations of the subject disclosure.

FIG. 1 shows a system 100 in which a server device 102, network (switch) device 104 and a storage device 106 handle workloads 108(1)-108(3). Although only three workloads 108(1)-108(3) are shown in FIG. 1, it is understood that such devices can handle any practical number of workloads.

Based on the type of device, various metrics are collected that relate to power consumption of a device. For example for the storage device 106, collected metrics can include input-output operations per second (IOPS), bandwidth, percentage reads and writes. For the network device 104, collected metrics can similarly include input-output operations per second (IOPS), bandwidth, as well as the number of connections. Power consumed while idle can also be obtained. For a server, collected metrics can include central processing unit (CPU) utilization data, maximum power data, idle power data, memory utilization data, and input-output utilization data, e.g., for a local storage device.

Based on the collected metrics, server average power determination logic 112, switch average power determination logic 114 and storage device average power determination logic 116 compute power usage per workload as described herein. Based on the power usage per workload data and the location of the devices/workloads, climate score determination logic 118 determines climate impact carbon footprint climate impact scores for the workloads.

Figure 2:
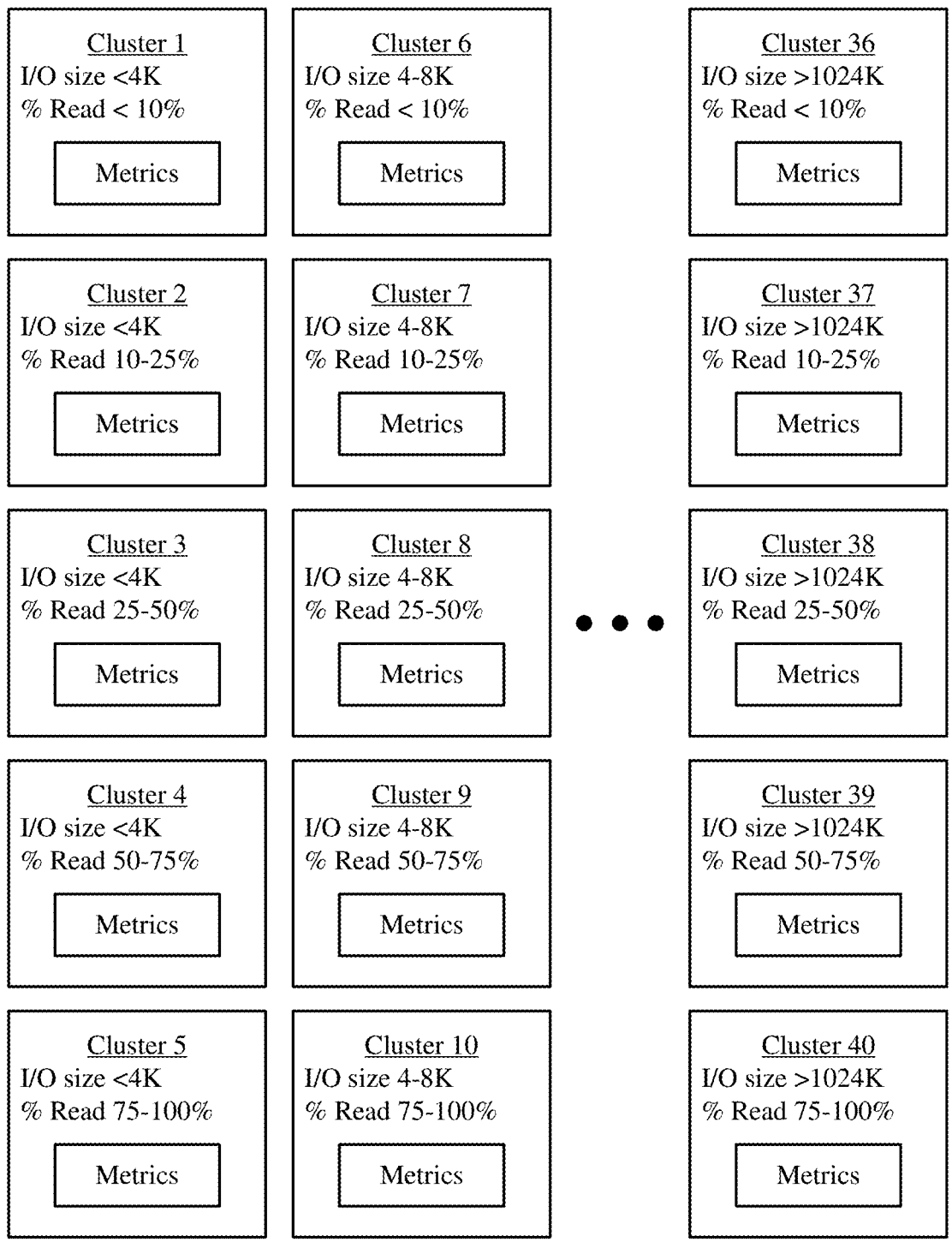
FIG. 2 is an example of determining clusters, corresponding to workloads, based on input-output size data and percentage read data of devices, in accordance with various aspects and implementations of the subject disclosure.
Figure 3:
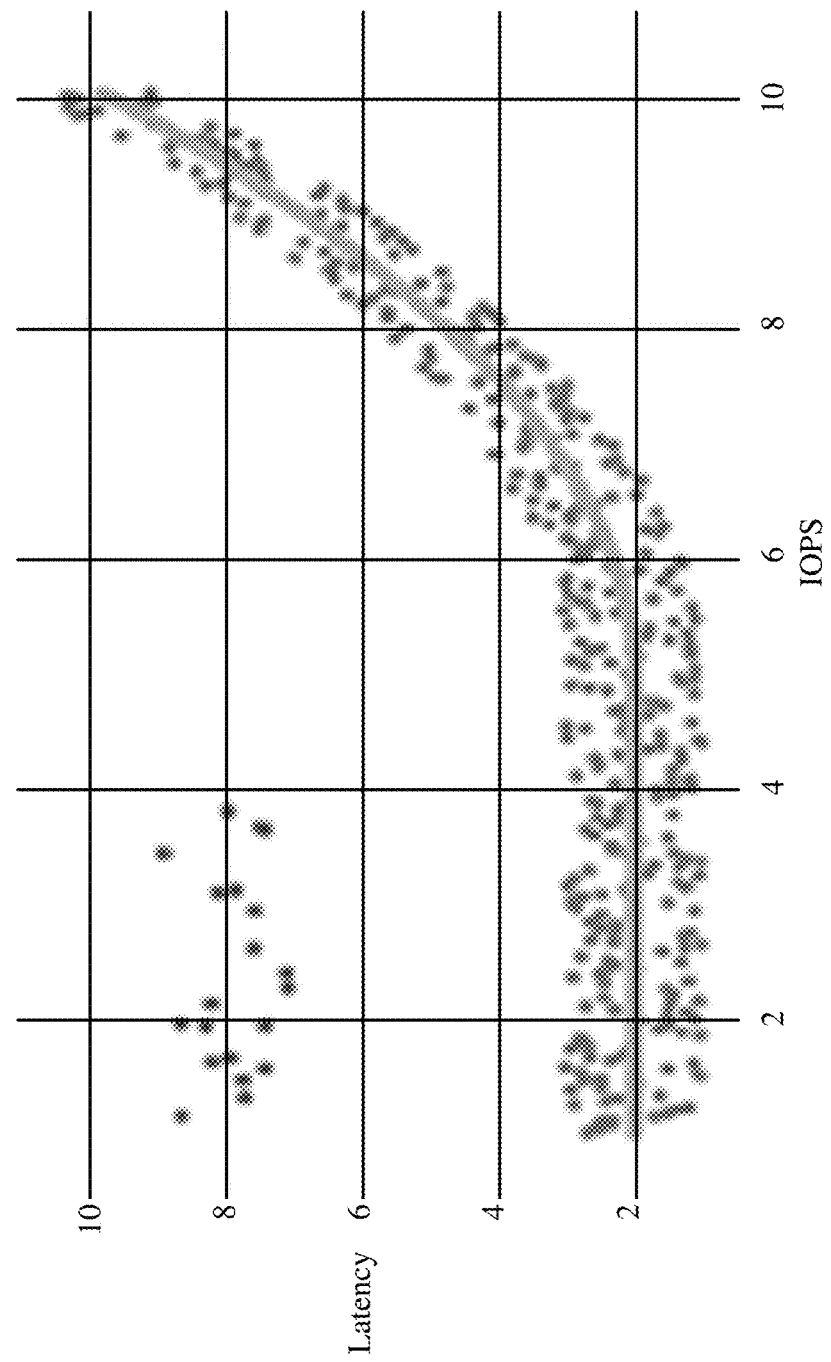
FIG. 3 is an example graphical representation of latency versus input-output operations per second (IOPS) for an example workload based on input-output size data and percentage read data, in accordance with various aspects and implementations of the subject disclosure.

More particularly, as represented in FIG. 2 in one implementation storage devices are clustered by I-O size data and percentage read (or alternatively percentage write) data. FIG. 3 is an example graphical representation of latency versus input-output operations per second (IOPS) for an example workload based on input-output size data and percentage read data, Each cluster represents a different workload on the system for that storage device cluster. For example, as shown via clusters 1-40 in FIG. 2, there can be a cluster for each combination of I-O size data and percentage read data, that is, for each I-O size (<4K, 4-8K, 8-16K, 16-32k, 32-64k, 64-512K, 512-1024K, >1024) and for each percentage read data range (<10%, 10-25%, 205-50%, 50-75%, 75-100%). Note that not all clusters may exist; e.g., there may not be any storage device workloads with less than ten percent reads.

For a storage device workload, the storage device average power determination logic 116 computes the following average power (Pavg) consumption values; note that reads (Pread) and writes (Pwrite) consume different amounts of power:

$$Pavg\ for\ Workload = (Pwrite*\%\ write + Pread*\%\ read)/bandwidth\ for\ workload,$$

and calculates the average power for the system as:

$$Pavg\ for\ system = (Sum\ for\ workloads\ p\_WL\_avg + Pidle)/100.$$

For a network device (e.g., switch), power usage for each workload depends on similar metrics to storage devices but also on the number of connections. Similar to storage devices, in one implementation network devices are clustered by IOSize data, and there can be a cluster for each IOSize (<4K, 4-8K, 8-16K, 16-32k, 32-64k, 64-512K, 512-1024K, >1024) and percentage read (<10%, 10-25%, 205-50%, 50-75%, 75-100%) combination, where each cluster represent a different workload on the system for the network device cluster. The metrics collected are IOPS (reads and writes and percentages) and bandwidth, and the number of connections for each workload is obtained.

The network device average power determination logic 114 calculates the average power and power/bandwidth for each network device cluster as:

$$Pavg\ for\ Workload = (Pwrite*\%\ write + Pread*\%\ read)/bandwidth\ for\ Workload + Pconnections*number\ of\ Workload\ connections,$$

and calculates the average power for the system as:

$$Pavg\ for\ system = (Sum\ for\ all\ workloads\ p\_WL\_avg + Pidle)/100.$$

For the servers, based on data center topology, the server(s) connected to the switch are identified, and the server average power determination logic 112 calculates the power usage for a workload based on CPU utilization, memory utilization and IO utilization as:

$$P\_CPU\_UTIL\_WL\_avg\ for\ Workload = (Pmax - Pidle) cpuUtilization/100 + Pidle;$$

for example a typical hourly power calculation based the CPU utilization can be (500−250) *75/100+200=250 watts; converted to a daily value of =250*24=6000 w=6 kw (hours) and Yearly=6*365=2190 kwh.

Memory utilization data is further used, as is IO utilization:

$$P\_MEMORY\_UTIL\_WL\_avg = (Pmax - Pidle)memoryUtilization/100 + Pidle$$

$$P\_IO\_UTIL\_WL\_avg\ for\ Workload = (Pmax - Pidle)ioUtilization/100 + Pidle.$$

For a system, the average server power usage is:

$$Pavg\ for\ system = (Sum\ for\ all\ workloads\ p\_WL\_avg + Pidle)/100.$$

Figure 4:
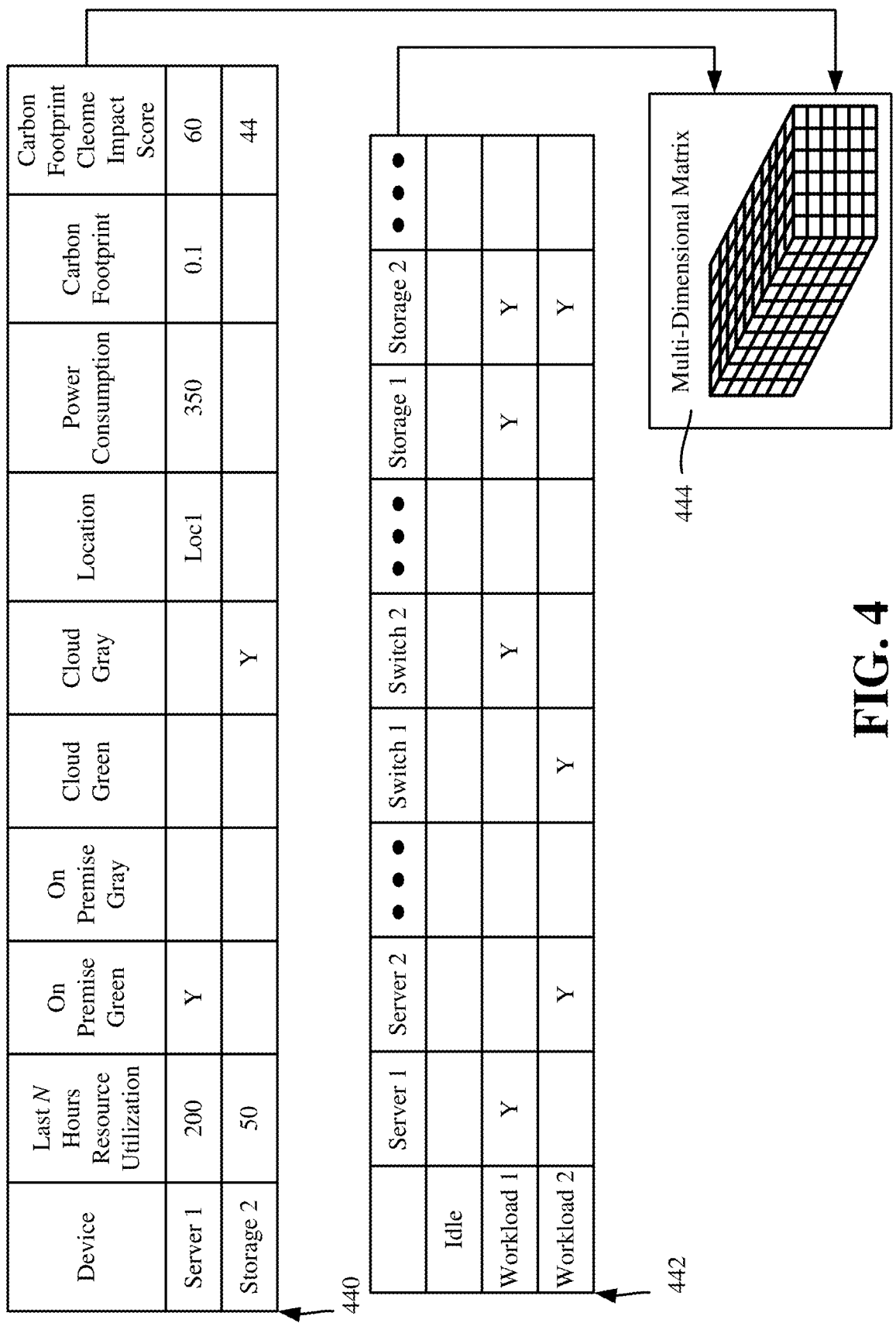
FIG. 4 is an example representation of creating a multi-dimensional matrix based on devices, workloads and resource utilization, in accordance with various aspects and implementations of the subject disclosure.

The various data can be arranged as desired. For example, as represented in FIG. 4 in example two-dimensional tables 440 and 442 for devices, workloads and resource utilization, a multidimensional matrix 444 can be created. This, for example, allows leveraging scalable and efficient matrix math to calculate power consumption, carbon footprint and normalized climate impact score. Sankey charts can be based thereon to visualize the carbon footprint and climate impact.

Note that on premise workloads can be distinguished from cloud workloads (which generally have less climate impact than on premise workloads, and for example, associated with a color, wherein in industry terminology a "Green Cloud" means datacenter energy is sourced from renewables, and a "Gray Cloud" means datacenter energy is not one-hundred percent sourced from renewables. This can identify if a device is:
  On premise Green→Climate Impact Score=0
  On premise Gray→Climate Impact>0, normalized across devices based on power usage
  Cloud Green→Climate Impact Score=0
  Cloud Gray→Climate Impact>0, normalized across devices based on:
    power usage, /2 for on premise grey With the power usage results from calculating the power usage per workload, a carbon footprint value can be calculated per workload based on location of the workload. Note that existing per-location APIs and the like can be leveraged for this, e.g., in the US, a zip code can provide the location data, whereby it is straightforward to convert power usage data to a carbon footprint climate impact score.

Such scores, for example, can be normalized across multiple workloads as well as datacenters, e.g., zero to one-hundred, with zero representing no climate impact/there is a green solution, and higher numbers representing a higher climate impact:

$$Climate\ Impact\ Score = ((x - xmin)/(xmax - xmin))*100.$$

Figure 5:
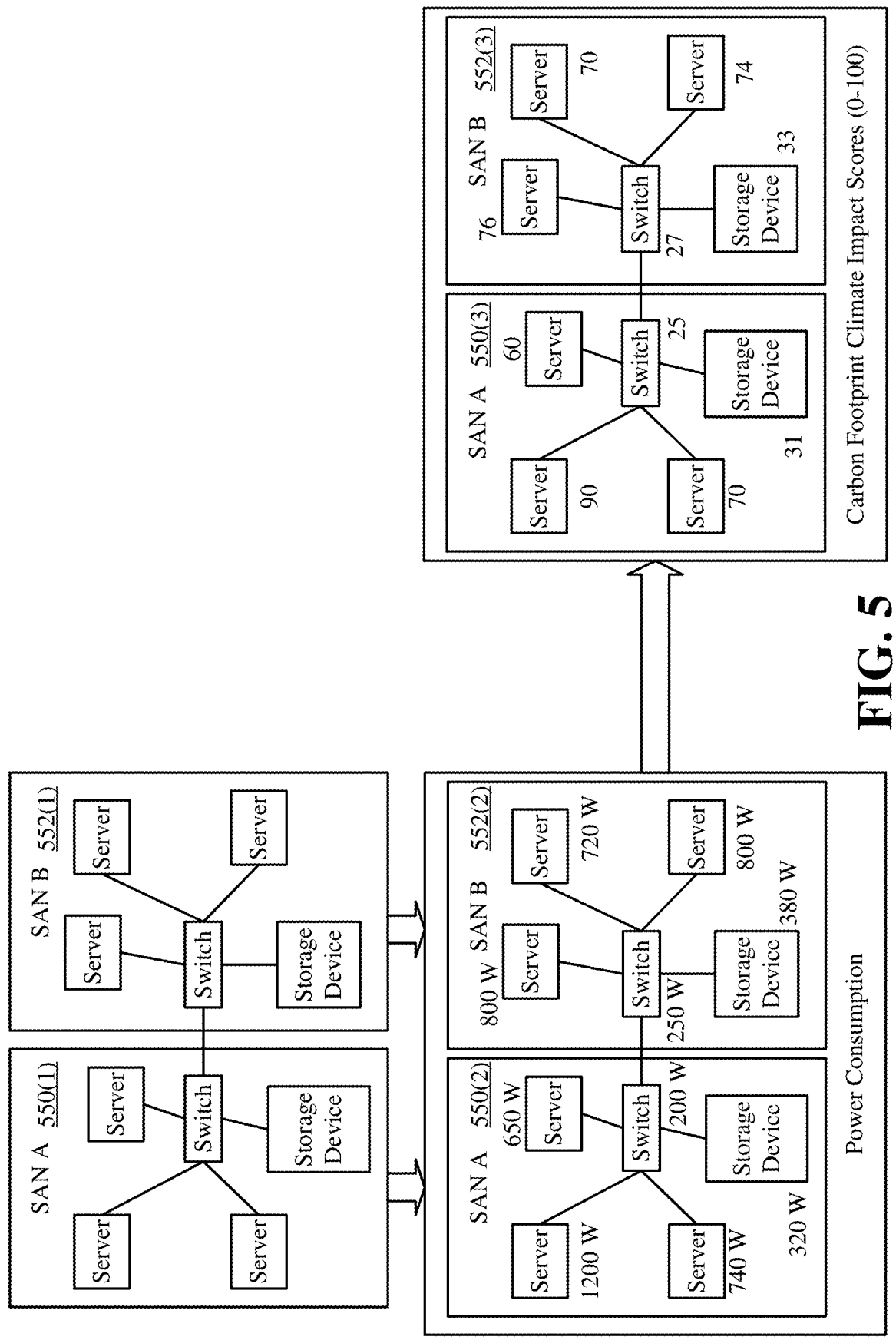
FIG. 5 is an example block diagram representation of determining carbon footprint climate impact scores based on power consumption of workloads, in accordance with various aspects and implementations of the subject disclosure.

FIG. 5 shows an example of a datacenter with two storage area networks (SAN A and SAN B) in a first state (blocks 550(1) and 552(1)) in which the metrics are being collected. As can be seen in the example of FIG. 5, in a second state (blocks 550(2) and 552(2)), the power consumption of each device has been determined as described herein to obtain a per workload power usage value (in Watts, W). In a third state represented by (blocks 550(3) and 552(3)), these power usage values are converted to normalized carbon footprint climate impact scores (0-100).

Figure 6:
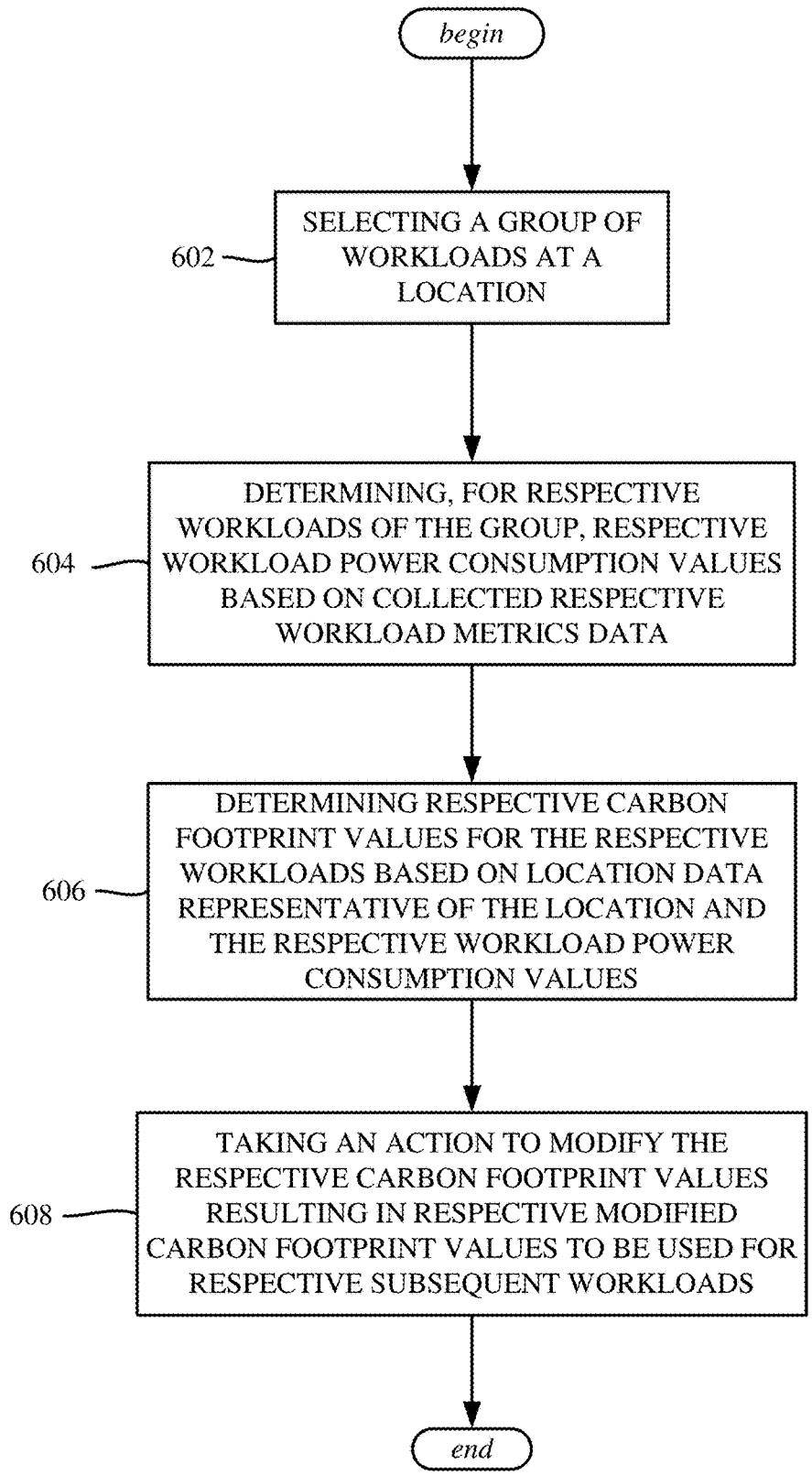
FIG. 6 is a flow diagram showing example operations related to determining respective carbon footprint values for respective workloads and taking an action based thereon, in accordance with various aspects and implementations of the subject disclosure.

One or more aspects can be embodied in a system, such as represented in FIG. 6, and for example can comprise a memory that stores computer executable components and/or operations, and a processor that executes computer executable components and/or operations stored in the memory. Example operations can comprise operation 602, which represents selecting a group of workloads at a location. Operation 604 represents determining, for respective workloads of the group, respective workload power consumption values based on collected respective workload metrics data. Operation 606 represents determining respective carbon footprint values for the respective workloads based on location data representative of the location and the respective workload power consumption values. Operation 608 represents taking an action to modify the respective carbon footprint values resulting in respective modified carbon footprint values to be used for respective subsequent workloads.

The group of workloads can include a group of storage systems. The collected respective workload metrics data can include respective input-output operations per second data and respective bandwidth data.

Further operations can include clustering the storage devices into respective subgroups of the group based on respective input-output size data and respective percentage read data, and wherein the respective workloads correspond to the respective subgroups. The collected respective workload metrics data can include respective input-output operations per second data and respective bandwidth data collected per subgroup. Determining the respective workload power consumption values can include summing respective write power values based on respective first percentages of write input-output operations with respective read power values, and based on respective second percentages of read input-output operations to obtain respective summed power values, and dividing the respective summed power values by respective bandwidth data. Further operations can include summing the respective workload power consumption values and an idle power consumption value to obtain a storage system value; determining the carbon footprint value based on the location data and the respective workload power consumption values can include using the storage system value and the location data.

The group of workloads can include a group of network devices. The collected respective workload metrics data can include respective input-output operations per second data, respective number of connections data, and respective bandwidth data.

Further operations can include clustering the network devices into subgroups of the group based on respective input-output size data associated with the network devices and respective percentage read data representative of respective percentages of reads associated with the network devices, and wherein the respective workloads correspond to respective subgroups. The collected respective workload metrics data can include respective input-output operations per second data and respective bandwidth data collected per subgroup. Determining the respective workload power consumption values can include summing respective power write values based on respective percentages of write input-output operations with respective power read values based on respective percentages of read input-output operations to obtain respective summed power values, and dividing the respective summed power values by respective bandwidth data and the respective number of connections data. Further operations can include summing the respective workload power consumption values and an idle power consumption value to obtain a network system value; determining the carbon footprint value based on the location data and the respective workload power consumption values can include using the network system value and the location data.

The group of workloads can include a group of server systems. The collected respective workload metrics data can include respective power maximum data, respective power idle data, respective central processing unit utilization data, respective memory utilization data and respective input-output utilization data.

Figure 7:
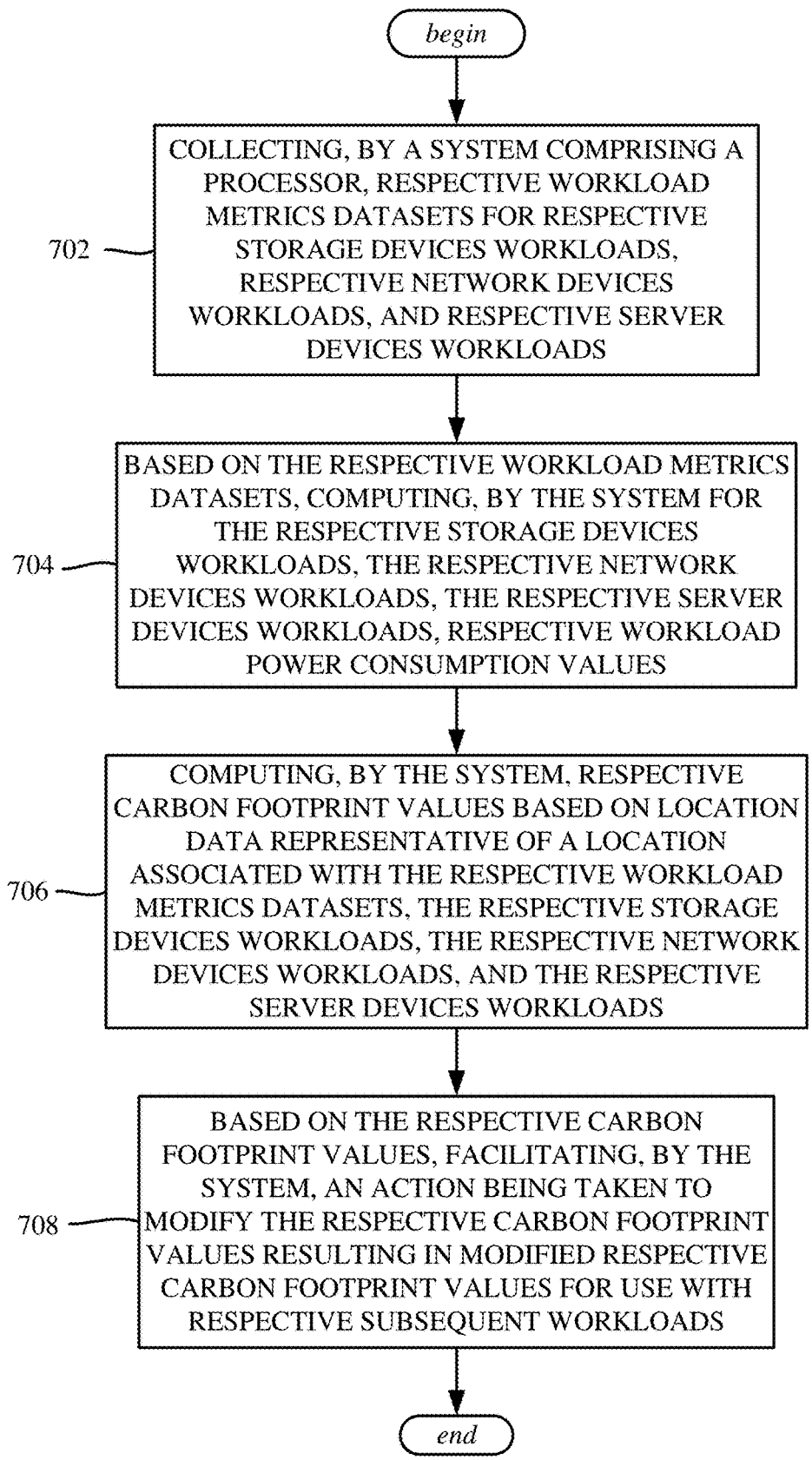
FIG. 7 is a flow diagram showing example operations related to computing power consumption values for storage device workloads, network device workloads, and server device workloads for determining carbon footprint values for the workloads, in accordance with various aspects and implementations of the subject disclosure.

One or more example aspects, such as corresponding to example operations of a method, are represented in FIG. 7. Operation 702 represents collecting, by a system comprising a processor, respective workload metrics datasets for respective storage devices workloads, respective network devices workloads, and respective server devices workloads. Operation 704 represents, based on the respective workload metrics datasets, computing, by the system for the respective storage devices workloads, the respective network devices workloads, the respective server devices workloads, respective workload power consumption values. Operation 706 represents computing, by the system, respective carbon footprint values based on location data representative of a location associated with the respective workload metrics datasets, the respective storage devices workloads, the respective network devices workloads, and the respective server devices workloads. Operation 708 represents, based on the respective carbon footprint values, facilitating, by the system, an action being taken to modify the respective carbon footprint values resulting in modified respective carbon footprint values for use with respective subsequent workloads.

Operations can include clustering, by the system, the storage devices based on respective first input-output size data and respective first percentage read data into respective storage device clusters corresponding to the respective storage device workloads; first datasets of the respective workload metrics datasets for the storage devices can include respective storage device input-output operations per second data and respective storage device bandwidth data, and clustering, by the system, the network devices based on respective second input-output size data and respective second percentage read data into respective network devices clusters corresponding to the respective network device workloads; second datasets of the respective workload metrics datasets for the respective network devices can include respective network device input-output operations per second data, respective number of connections data, and respective network device bandwidth data.

Collecting the respective workload metrics datasets for the respective server devices can include collecting respective server device power maximum data, collecting respective server device power idle data, collecting respective server device central processing unit utilization data, collecting respective server device memory utilization data and collecting respective server device input-output utilization data.

Figure 8:
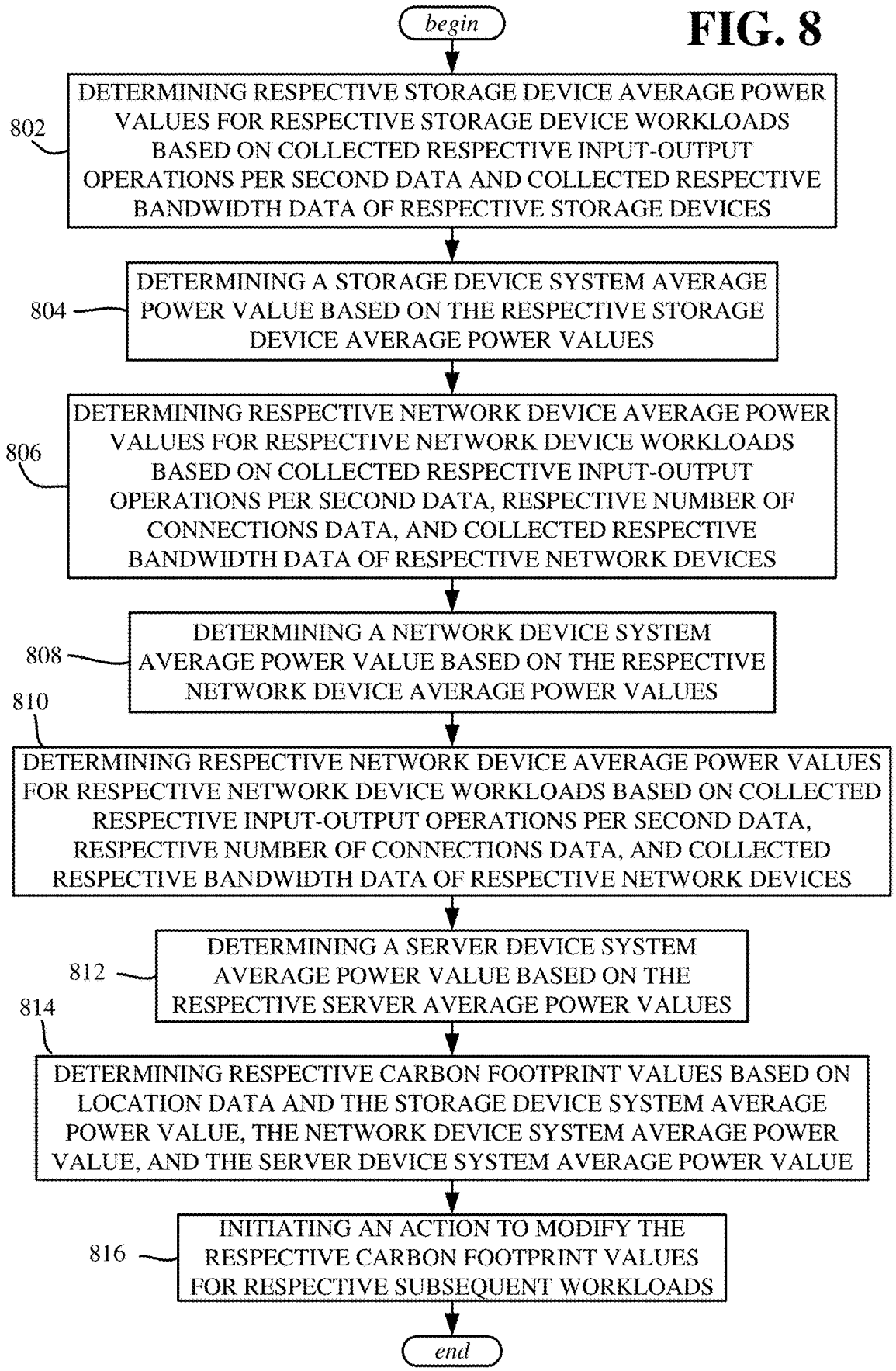
FIG. 8 is a flow diagram showing example operations related to determining average power values for storage devices, network devices and server devices for determining carbon footprint values for workloads, in accordance with various aspects and implementations of the subject disclosure.

FIG. 8 summarizes various example operations, e.g., corresponding to a machine-readable medium, comprising executable instructions that, when executed by a processor, facilitate performance of operations. Operation 802 represents determining respective storage device average power values for respective storage device workloads based on collected respective input-output operations per second data and collected respective bandwidth data of respective storage devices. Operation 804 represents determining a storage device system average power value based on the respective storage device average power values. Operation 806 represents determining respective network device average power values for respective network device workloads based on collected respective input-output operations per second data, respective number of connections data, and collected respective bandwidth data of respective network devices. Operation 808 represents determining a network device system average power value based on the respective network device average power values. Operation 810 represents determining respective network device average power values for respective network device workloads based on collected respective input-output operations per second data, respective number of connections data, and collected respective bandwidth data of respective network devices. Operation 812 represents determining a server device system average power value based on the respective server average power values. Operation 814 represents determining respective carbon footprint values based on location data and the storage device system average power value, the network device system average power value, and the server device system average power value. Operation 816 represents initiating an action to modify the respective carbon footprint values for respective subsequent workloads.

Further operations can include clustering the storage devices based on respective first input-output size data and respective first percentage read data into respective storage device clusters corresponding to the respective storage device workloads, and clustering the network devices based on respective second input-output size data and respective second percentage read data into respective network devices clusters corresponding to the respective network device workloads.

As can be seen, the technology described herein provides an objective climate impact score based on workloads, which can be normalized, and provide resource utilization per workload data, including workloads across an entire datacenter. By determining resource utilization per workload, the technology is able to view and leverage multidimensional matrix manipulation for calculation at scale. The scores can be determined without impacting the workloads. Further, the score can be leveraged to take action such as to reduce/optimize the overall carbon footprint, to recommend upgrading to a different hardware model to reduce the carbon footprint, to move one or more workloads (e.g., to a different location, and/or to different hardware) to reduce the overall carbon footprint, and the like.

Figure 9:
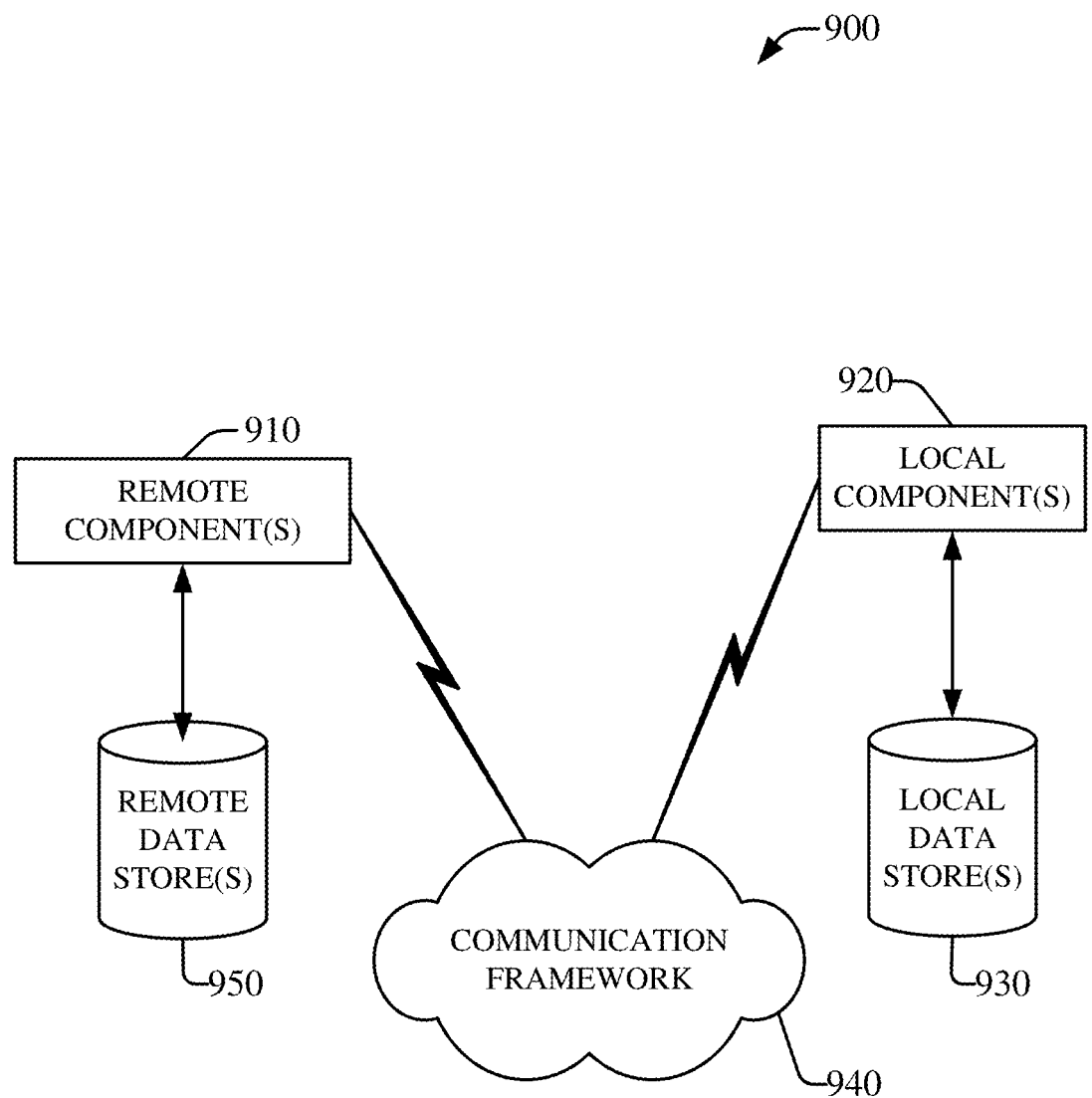
FIG. 9 is a block diagram representing an example computing environment into which aspects of the subject matter described herein may be incorporated.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can be a distributed computer system, connected to a local automatic scaling component and/or programs that use the resources of a distributed computer system, via communication framework 940. Communication framework 940 can comprise wired network devices, wireless network devices, mobile devices, wearable devices, radio access network devices, gateway devices, femtocell devices, servers, etc.

The system 900 also comprises one or more local component(s) 920. The local component(s) 920 can be hardware and/or software (e.g., threads, processes, computing devices). In some embodiments, local component(s) 920 can comprise an automatic scaling component and/or programs that communicate/use the remote resources 910 and 920, etc., connected to a remotely located distributed computing system via communication framework 940.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940.

Figure 10:
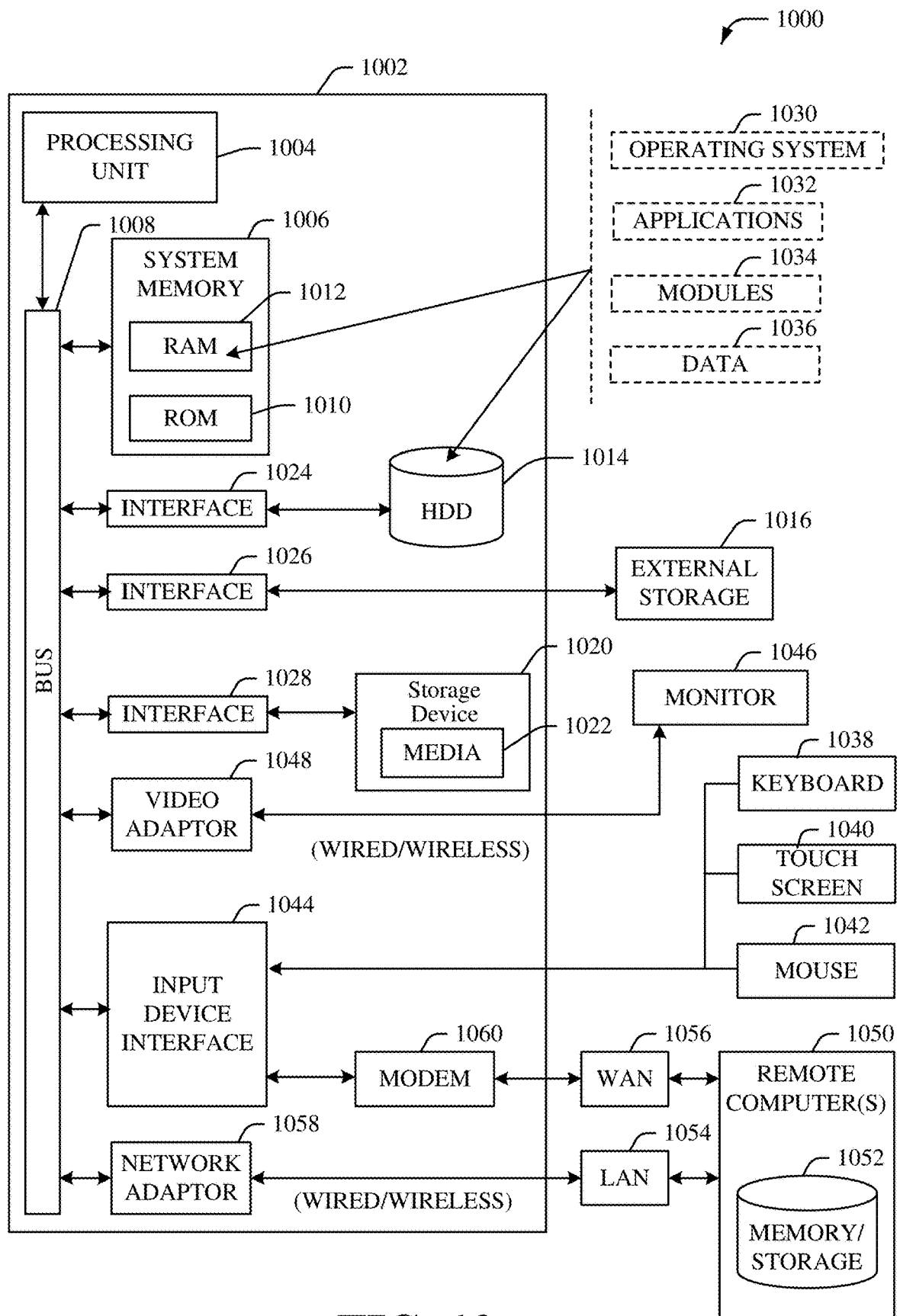
FIG. 10 depicts an example schematic block diagram of a computing environment with which the disclosed subject matter can interact/be implemented at least in part, in accordance with various aspects and implementations of the subject disclosure.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), and can include one or more external storage devices 1016 (e.g., a magnetic floppy disk drive (FDD) 1016, a memory stick or flash drive reader, a memory card reader, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014.

Other internal or external storage can include at least one other storage device 1020 with storage media 1022 (e.g., a solid state storage device, a nonvolatile memory device, and/or an optical disk drive that can read or write from removable media such as a CD-ROM disc, a DVD, a BD, etc.). The external storage 1016 can be facilitated by a network virtual machine. The HDD 1014, external storage device(s) 1016 and storage device (e.g., drive) 1020 can be connected to the system bus 1008 by an HDD interface 1024, an external storage interface 1026 and a drive interface 1028, respectively.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A method, comprising:
    collecting, by a system comprising a processor, respective workload metrics datasets for respective storage devices workloads, respective network devices workloads, and respective server devices workloads, wherein the collecting the respective workload metrics datasets for the respective server devices comprises collecting respective server device power maximum data, collecting respective server device power idle data, collecting respective server device central processing unit utilization data, collecting respective server device memory utilization data, and collecting respective server device input-output utilization data;
    based on the respective workload metrics datasets, computing, by the system for the respective storage devices workloads, the respective network devices workloads, the respective server devices workloads, respective workload power consumption values;
    computing, by the system, respective carbon footprint values based on location data representative of a location associated with the respective workload metrics datasets, the respective storage devices workloads, the respective network devices workloads, and the respective server devices workloads; and
    based on the respective carbon footprint values, facilitating, by the system, an action being taken to modify the respective carbon footprint values resulting in modified respective carbon footprint values for use with respective subsequent workloads.

2. The method of claim 1, further comprising:
    clustering, by the system, the storage devices based on respective first input-output size data and respective first percentage read data into respective storage device clusters corresponding to the respective storage device workloads, wherein first datasets of the respective workload metrics datasets for the storage devices comprise respective storage device input-output operations per second data and respective storage device bandwidth data, and
    clustering, by the system, the network devices based on respective second input-output size data and respective second percentage read data into respective network devices clusters corresponding to the respective network device workloads, wherein second datasets of the respective workload metrics datasets for the respective network devices comprise respective network device input-output operations per second data, respective number of connections data, and respective network device bandwidth data.

3. A non-transitory machine-readable medium, comprising executable instructions that, when executed by a processor, facilitate performance of operations, the operations comprising:
    determining respective storage device average power values for storage device workloads of storage devices based on collected respective input-output operations per second data and collected respective bandwidth data of the storage devices;
    determining a storage device system average power value based on the respective storage device average power values;
    determining respective network device average power values for network device workloads of network devices based on collected respective input-output operations per second data, respective number of connections data, and collected respective bandwidth data of network devices;
    determining a network device system average power value based on the respective network device average power values;
    determining respective server average power values for server workloads of servers based on collected respective processor utilization data, collected respective memory utilization data, and collected respective input-output utilization data of the servers;

determining a server device system average power value based on the respective server average power values;

determining respective carbon footprint values for the storage devices, network devices, and the servers based on location data and the storage device system average power value, the network device system average power value, and the server device system average power value; and initiating an action to modify at least one of the respective carbon footprint values for respective subsequent workloads.

4. The non-transitory machine-readable medium of claim 3, wherein the operations further comprise:

clustering the storage devices based on respective first input-output size data and respective first percentage read data into respective storage device clusters corresponding to the storage device workloads, and clustering the network devices based on respective second input-output size data and respective second percentage read data into respective network devices clusters corresponding to the network device workloads.

5. The non-transitory machine-readable medium of claim 3, wherein the determining the respective storage device average power values for the storage device workloads of the storage devices, comprises:

summing respective write power values based on respective percentages of write input-output operations associated with the storage devices represented in the collected respective input-output operations per second data of the storage devices with respective read power values based on respective percentages of read input-output operations associated with the storage devices represented in the collected respective input-output operations per second data of the storage devices to obtain respective summed power values associated with the storage devices; and dividing the respective summed power values associated with the storage devices by respective bandwidth data associated with the storage devices represented in the collected respective bandwidth data.

6. The non-transitory machine-readable medium of claim 5, wherein the determining the storage device system average power value, comprises summing the respective storage device average power values and an idle power consumption value associated with the storage devices to obtain the storage device system average power value.

7. The non-transitory machine-readable medium of claim 3, wherein the determining the respective network device average power values for the network device workloads of the network devices, comprises:

summing respective write power values based on respective percentages of write input-output operations associated with the storage devices represented in the collected respective input-output operations per second data of the network devices with respective read power values based on respective percentages of read input-output operations associated with the network devices represented in the collected respective input-output operations per second data of the network devices to obtain respective summed power values associated with the network devices; and dividing the respective summed power values associated with the network devices by respective bandwidth data associated with the network devices represented in the collected respective bandwidth data associated with the network devices.

8. The non-transitory machine-readable medium of claim 7, wherein the determining the network device system average power value, comprises summing the respective network device average power values and an idle power consumption value associated with the network devices to obtain the network device system average power value.

9. The non-transitory machine-readable medium of claim 3, wherein the action comprises recommending a hardware upgrade to a device associated with a workload of the storage device workloads, the network device workloads, or the server workloads.

10. The non-transitory machine-readable medium of claim 3, wherein the action comprises moving a workload of the storage device workloads, the network device workloads, or the server workloads to a different location.

11. The non-transitory machine-readable medium of claim 3, wherein the action comprises moving a workload of the storage device workloads, the network device workloads, or the server workloads to a different device.

12. A system, comprising:

a processor; and a memory that stores executable instructions that, when executed by the processor, facilitate performance of operations, the operations comprising:

determining respective storage device average power values for storage device workloads of storage devices based on collected respective input-output operations per second data and collected respective bandwidth data of the storage devices;

determining a storage device system average power value based on the respective storage device average power values;

determining respective network device average power values for network device workloads of network devices based on collected respective input-output operations per second data, respective number of connections data, and collected respective bandwidth data of network devices;

determining a network device system average power value based on the respective network device average power values;

determining respective server average power values for server workloads of servers based on collected respective processor utilization data, collected respective memory utilization data, and collected respective input-output utilization data of the servers;

determining a server device system average power value based on the respective server average power values;

determining respective carbon footprint values for the storage devices, network devices, and the servers based on location data and the storage device system average power value, the network device system average power value, and the server device system average power value; and initiating an action to modify at least one of the respective carbon footprint values for respective subsequent workloads.

13. The system of claim 12, wherein the operations further comprise:

clustering the storage devices based on respective first input-output size data and respective first percentage read data into respective storage device clusters corresponding to the respective storage device workloads, and clustering the network devices based on respective second input-output size data and respective second percentage read data into respective network devices clusters corresponding to the respective network device workloads.

14. The system of claim 12, wherein the determining the respective storage device average power values for the storage device workloads of the storage devices, comprises:
   summing respective write power values based on respective percentages of write input-output operations associated with the storage devices represented in the collected respective input-output operations per second data of the storage devices with respective read power values based on respective percentages of read input-output operations associated with the storage devices represented in the collected respective input-output operations per second data of the storage devices to obtain respective summed power values associated with the storage devices; and
   dividing the respective summed power values associated with the storage devices by respective bandwidth data associated with the storage devices represented in the collected respective bandwidth data.

15. The system of claim 14, wherein the determining the storage device system average power value, comprises summing the respective storage device average power values and an idle power consumption value associated with the storage devices to obtain the storage device system average power value.

16. The system of claim 12, wherein the determining the respective network device average power values for the network device workloads of the network devices, comprises:
   summing respective write power values based on respective percentages of write input-output operations associated with the storage devices represented in the collected respective input-output operations per second data of the network devices with respective read power values based on respective percentages of read input-output operations associated with the network devices represented in the collected respective input-output operations per second data of the network devices to obtain respective summed power values associated with the network devices; and
   dividing the respective summed power values associated with the network devices by respective bandwidth data associated with the network devices represented in the collected respective bandwidth data associated with the network devices.

17. The system of claim 16, wherein the determining the network device system average power value, comprises summing the respective network device average power values and an idle power consumption value associated with the network devices to obtain the network device system average power value.

18. The system of claim 12, wherein the action comprises recommending a hardware upgrade to a device associated with a workload of the storage device workloads, the network device workloads, or the server workloads.

19. The system of claim 12, wherein the action comprises moving a workload of the storage device workloads, the network device workloads, or the server workloads to a different location.

20. The system of claim 12, wherein the action comprises moving a workload of the storage device workloads, the network device workloads, or the server workloads to a different device.

* * * * *